(12) United States Patent
Farshi et al.

(10) Patent No.: US 9,535,654 B2
(45) Date of Patent: Jan. 3, 2017

(54) METHOD AND APPARATUS FOR ASSOCIATING AN AUDIO SOUNDTRACK WITH ONE OR MORE VIDEO CLIPS

(71) Applicant: HERE GLOBAL B.V., Veldhoven (NL)

(72) Inventors: Oliver Farshi, San Francisco, CA (US); Sebastian Frey, Woodland Hills, CA (US); Charlie Sutton, San Francisco, CA (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/540,715

(22) Filed: Nov. 13, 2014

(65) Prior Publication Data

US 2016/0139871 A1 May 19, 2016

(51) Int. Cl.
| | |
|---|---|
| H04N 9/802 | (2006.01) |
| G06F 3/16 | (2006.01) |
| G11B 27/34 | (2006.01) |
| G06F 3/0484 | (2013.01) |
| H04N 9/806 | (2006.01) |
| G11B 27/10 | (2006.01) |

(52) U.S. Cl.
CPC ........... *G06F 3/165* (2013.01); *G06F 3/04847* (2013.01); *G11B 27/10* (2013.01); *G11B 27/34* (2013.01); *H04N 9/806* (2013.01)

(58) Field of Classification Search
CPC ... G11B 27/031; G11B 27/032; G11B 27/034; H04N 5/262; H04N 5/265; H04N 21/806; H04N 21/8211; H04N 9/806
See application file for complete search history.

(56) References Cited

U.S. PATENT DOCUMENTS

| | | | | |
|---|---|---|---|---|
| 6,535,269 B2 * | 3/2003 | Sherman | ................ | G03B 31/00 352/6 |
| 6,670,966 B1 * | 12/2003 | Kusanagi | ............... | G11B 27/34 715/716 |
| 2007/0292106 A1 * | 12/2007 | Finkelstein | ............ | G11B 27/28 386/241 |
| 2009/0273712 A1 * | 11/2009 | Landy | .................. | G11B 27/005 348/515 |
| 2011/0258545 A1 * | 10/2011 | Hunter | ................... | G06Q 10/10 715/716 |

OTHER PUBLICATIONS

Soundtrack Pro 3 User Manual, Apple Inc. (2009) 102 pages.

* cited by examiner

*Primary Examiner* — Huy T Nguyen
(74) *Attorney, Agent, or Firm* — Alston & Bird LLP

(57) ABSTRACT

A method, apparatus and computer program product are provided to facilitate the association of a selected portion of an audio soundtrack with one or more video clips. In the context of a method, a visual representation of an audio soundtrack is caused to be displayed. The audio soundtrack is to be associated with one or more video clips to facilitate concurrent playback of at least a portion of the audio soundtrack and one or more video clips. The method also receives user input with respect to the audio soundtrack and, in response to the user input, adjusts a starting point of the audio soundtrack relative to the one or more video clips. The starting point may be adjusted by defining the starting point of the audio soundtrack based on the user input and also in a manner so as to coincide with a predefined feature of the audio soundtrack.

20 Claims, 6 Drawing Sheets

METHOD AND APPARATUS FOR ASSOCIATING AN AUDIO SOUNDTRACK WITH ONE OR MORE VIDEO CLIPS

TECHNOLOGICAL FIELD

An example embodiment of the present invention relates generally to a user interface configured to associate an audio soundtrack with one or more video clips and, more particularly, to a method and apparatus for permitting user synchronization of an audio soundtrack to one or more video clips.

BACKGROUND

Video clips are routinely captured and saved for subsequent viewing, sharing or the like. For example, video clips may be captured of special occasions, such as birthdays or other gatherings, of entertainment activities, such as sporting events, concerts or the like, for personal enjoyment or for any of a wide variety of other reasons.

In order to enrich the user experience associated with viewing of the video clips, music or other types of audio soundtracks may be associated with the video clips. Thus, when a video clip is selected for playback, the video may be displayed and the audio soundtrack that has been associated with the video may be concurrently output. Audio soundtracks may be associated with video clips in various manners. For example, the user may select any of various songs to be played while viewing a respective video clip. In this regard, applications are available to suggest songs that a user may consider associating with a video clip in an effort to reduce the effort expended by the user.

However, the simple association of a song with a video clip may not always produce the desired user experience in that the songs that are available to be associated with video clips may not, in their entirety, be consistent with the theme of the video clip. Moreover, applications intended to permit users to select a particular portion of an audio soundtrack to be associated with a video clip in an effort to provide more granular control have generally resulted in the selected portion of the audio soundtrack better matching the theme of the video clip, but have typically required the user to have more substantial audio editing experience or expertise in order to properly select a desired portion of the audio soundtrack and to successfully associate the selected portion with the video clip, thereby potentially limiting the utilization of such applications.

BRIEF SUMMARY

A method, apparatus and computer program product are provided in accordance with an example embodiment in order to facilitate the association of a selected portion of an audio soundtrack with one or more video clips. In this regard, the method, apparatus and computer program product permit the starting point of the audio soundtrack to be defined in an intuitive manner and to be synchronized based upon a predefined feature of the audio soundtrack. As such, the resulting user experience occasioned by the concurrent display of the video clip and the playback of the selected portion of the audio soundtrack may be enhanced.

In an example embodiment, a method is provided that includes causing display of a visual representation of an audio soundtrack. The audio soundtrack is to be associated with one or more video clips to facilitate concurrent playback of at least a portion of the audio soundtrack and one or more video clips. The method of this embodiment receives user input with respect to the audio soundtrack and, in response to the user input, adjusts a starting point of the audio soundtrack relative to the one or more video clips. In this regard, a starting point may be adjusted by defining the starting point of the audio soundtrack based on the user input and also in a manner so as to coincide with a predefined feature of the audio soundtrack.

The method of an example embodiment receives user input by receiving a drag input. In this embodiment, the method adjusts the starting point in a direction indicated by the drag input and defines the starting point to be a predefined time increment of the audio soundtrack that is nearest to a portion of the visual representation of the audio soundtrack that is aligned with a visual indication of a current playback location of the one or more video clips upon termination of the drag input. For example, the predefined time increment may correspond with a beat of the audio soundtrack and, in one embodiment, may be a second or a predefined fraction of a second. The method of this example embodiment may also include causing a predetermined audio output to be provided while receiving the user input with respect to the audio soundtrack.

The visual representation of an audio soundtrack of one embodiment includes a plurality of markers spaced there throughout. In this embodiment, the method receives user input by receiving a flick input. The method of this embodiment also adjusts the starting point to be coincident to the marker that is next in a direction indicated by the flick input. The method of an example embodiment also includes causing display of a frame of a video clip concurrent with the visual representation of the audio soundtrack and during receipt of the user input with respect to the audio soundtrack.

In another example embodiment, an apparatus is provided that includes at least one processor and at least one memory including computer program code with at least one memory and the computer program code configured to, with the processor, cause the apparatus to cause display of a visual representation of an audio soundtrack. The audio soundtrack is to be associated with one or more video clips to facilitate concurrent playback of at least a portion of the audio soundtrack and the one or more video clips. The at least one memory and the computer program code are also configured to, with the processor, cause the apparatus of this embodiment to receive user input with respect to the audio soundtrack and, in response to the user input, to adjust a starting point of the audio soundtrack relative to the one or more video clips. In this regard, the starting point is adjusted by defining the starting point of the audio soundtrack based on the user input and also in a manner so as to coincide with a predefined feature of the audio soundtrack.

The at least one memory and the computer program code are configured to, with the processor, cause the apparatus of an example embodiment to receive user input by receiving a drag input. The at least one memory and the computer program code are configured to, with the processor, cause the apparatus of this embodiment to adjust the starting point by adjusting the starting point in a direction indicated by the drag input and defining the starting point to be a predefined time increment of the audio soundtrack that is nearest to a portion of the visual indication of the audio soundtrack that is aligned with a visual representation of a current playback location of the one or more video clips upon termination of the drag input. The predefined time increment may correspond with a beat of the audio soundtrack and, in one embodiment, may be a second or predefined fraction of second. The at least one memory and the computer program code are further configured to, with the processor, cause the apparatus of this embodiment to cause a predetermined audio output to be provided while receiving the user input with respect to the audio soundtrack.

The visual representation of the audio soundtrack of one embodiment includes a plurality of markers spaced there throughout. The at least one memory and the computer program code are configured to, with the processor, cause the apparatus of this embodiment to receive user input by receiving a flick input. The at least one memory and the computer program code are configured to, with the processor, cause the apparatus of this embodiment to adjust the starting point to be coincident to the marker that is next in a direction indicated by the flick input. The at least one memory and the computer program code are further configured to, with the processor, cause the apparatus to cause display of a frame of a video clip concurrent with the visual representation of the audio soundtrack and during receipt of the user input with respect to the audio soundtrack.

In a further example embodiment, a computer program product is provided that includes at least one non-transitory computer-readable storage medium having computer-executable program code portions stored therein with the computer-executable program code portions including program code instructions configured to cause display of a visual representation of an audio soundtrack. The audio soundtrack is to be associated with one or more video clips to facilitate concurrent playback of at least a portion of the audio soundtrack and the one or more video clips. The computer-executable program code portions of this embodiment also include program code instructions configured to receive user input with respect to the audio soundtrack and program code instructions to, in response to the user input, adjust the starting point of the audio soundtrack relative to the one or more video clips. The program code instructions configured to adjust the starting point include program code instructions configured to define the starting point of the audio soundtrack based on the user input and also in a manner so as to coincide with a predefined feature of the audio soundtrack.

The program code instructions configured to receive user input include, in one embodiment, program code instructions configured to receive a drag input. In this embodiment, the program code instructions configured to adjust the starting point include program code instructions configured to adjust the starting point in a direction indicated by the drag input and to define the starting point to be a predefined time increment of the audio soundtrack that is nearest to a portion of the visual representation of the audio soundtrack that is aligned with a visual indication of a current playback location of the one or more video clips upon termination of the drag input. The predefined time increment may correspond with a beat of the audio soundtrack and, in one embodiment, may be a second or a predefined fraction of a second. The computer-executable program code portions of this embodiment may also include program code instructions configured to cause a predetermined audio output to be provided while receiving the user input with respect to the audio soundtrack.

The visual representation of the audio soundtrack of one embodiment includes a plurality of markers spaced there throughout. In this embodiment, the program code instructions configured to receive user input include program code instructions configured to receive a flick input. In this embodiment, the program code instructions configured to adjust the starting point include program code instructions configured to adjust the starting point to be coincident to the marker that is next in a direction indicated by the flick input. The computer-executable program code portions of an example embodiment also include program code instructions configured to cause the display of a frame of a video clip concurrent with the visual representation of the audio soundtrack and during receipt of the user input with respect to the audio soundtrack.

In yet another example embodiment, an apparatus is provided that includes means for causing display of a visual representation of an audio soundtrack. The audio soundtrack is to be associated with one or more video clips to facilitate concurrent playback of at least a portion of the audio soundtrack and one or more video clips. The apparatus of this embodiment includes means for receiving user input with respect to the audio soundtrack and, in response to the user input, means for adjusting a starting point of the audio soundtrack relative to the one or more video clips. In this regard, a starting point may be adjusted by defining the starting point of the audio soundtrack based on the user input and also in a manner so as to coincide with a predefined feature of the audio soundtrack.

BRIEF DESCRIPTION OF THE DRAWINGS

Figure 1:
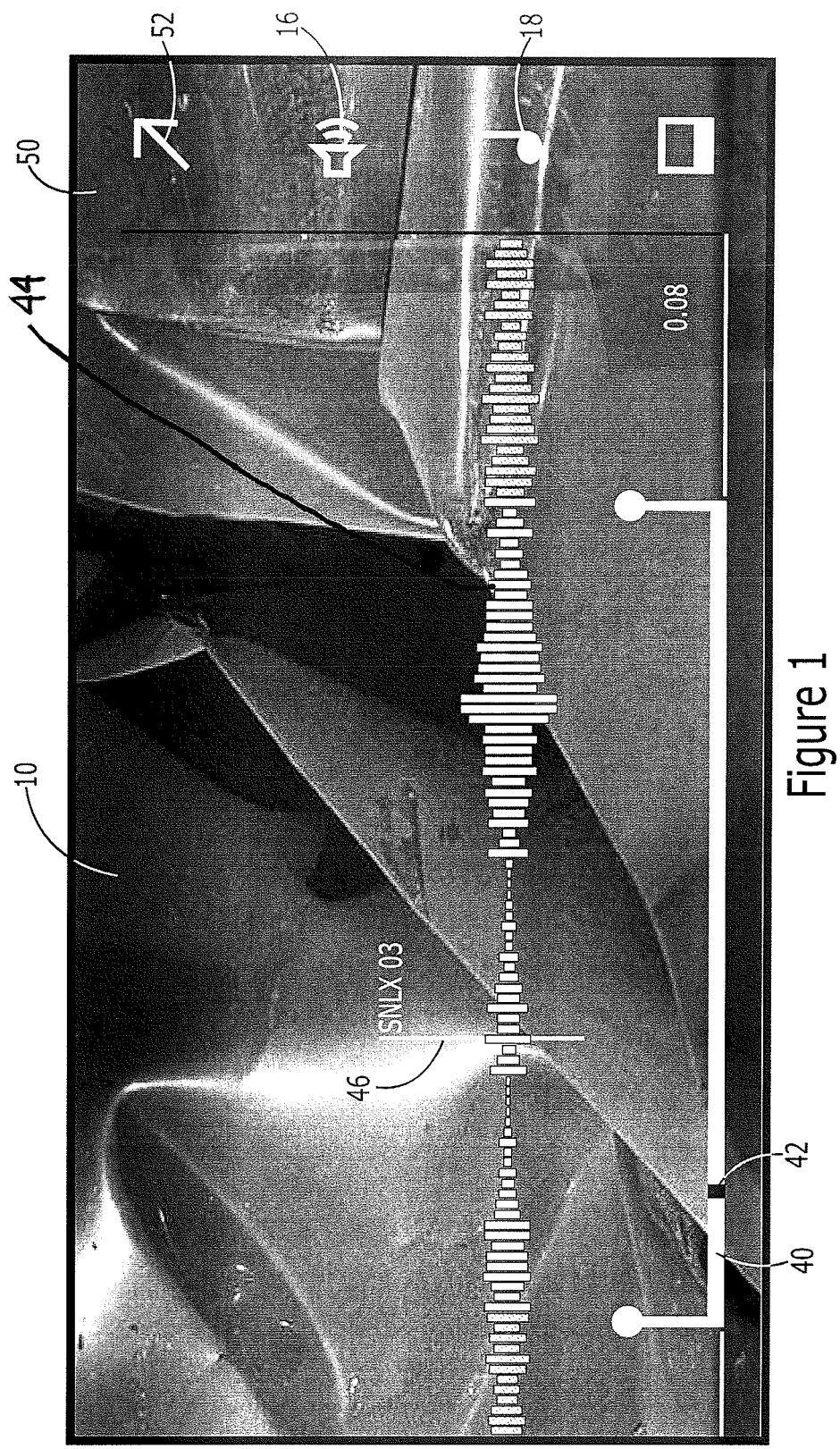
Figure 2:
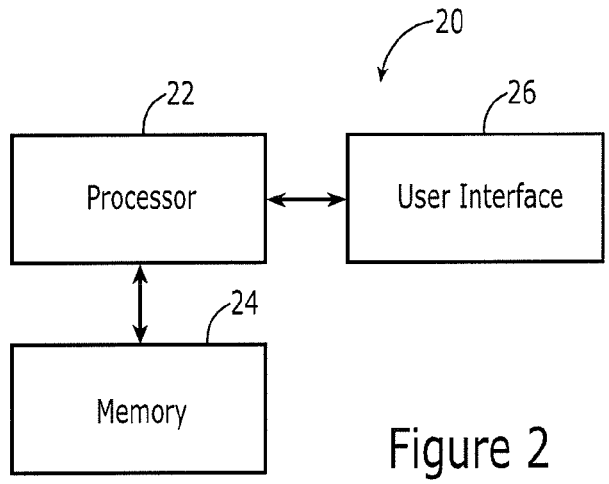
Figure 3:
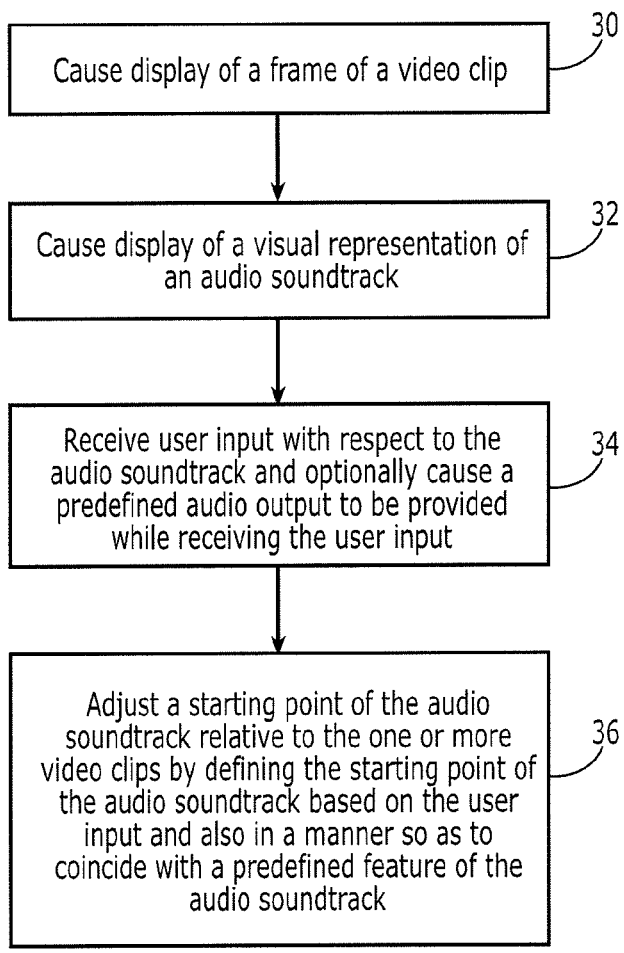
Figure 4:
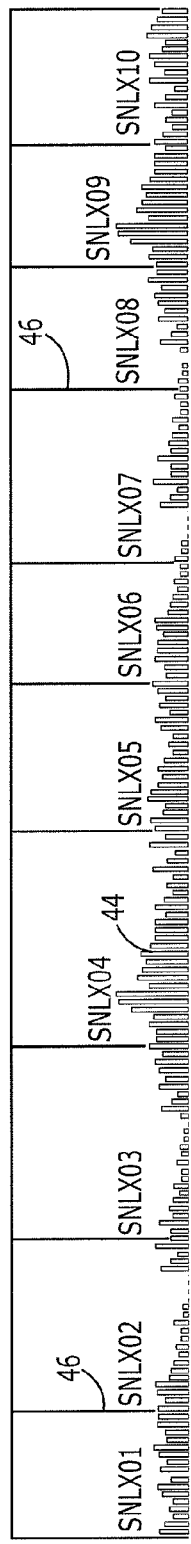
Figure 5:
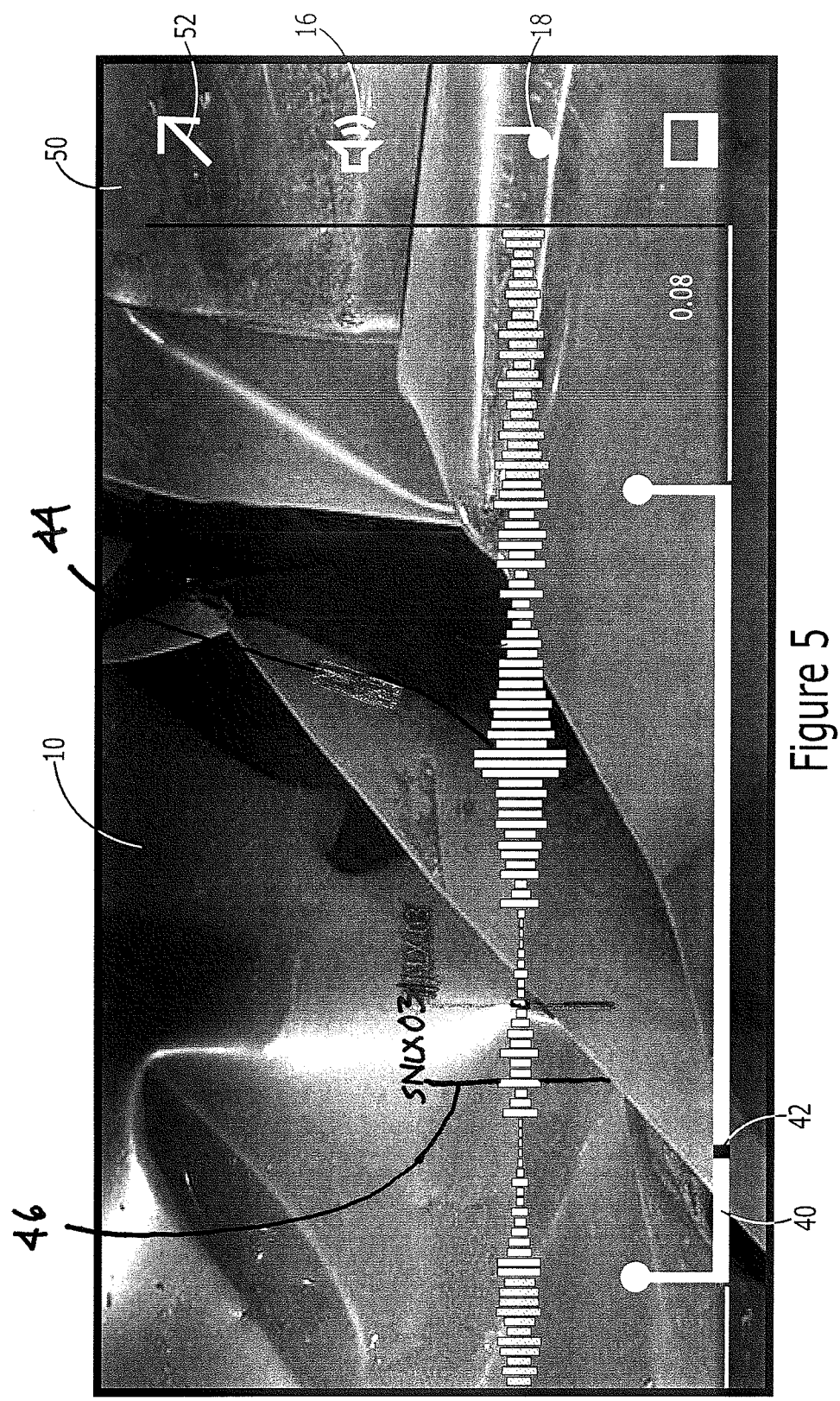
Figure 6:
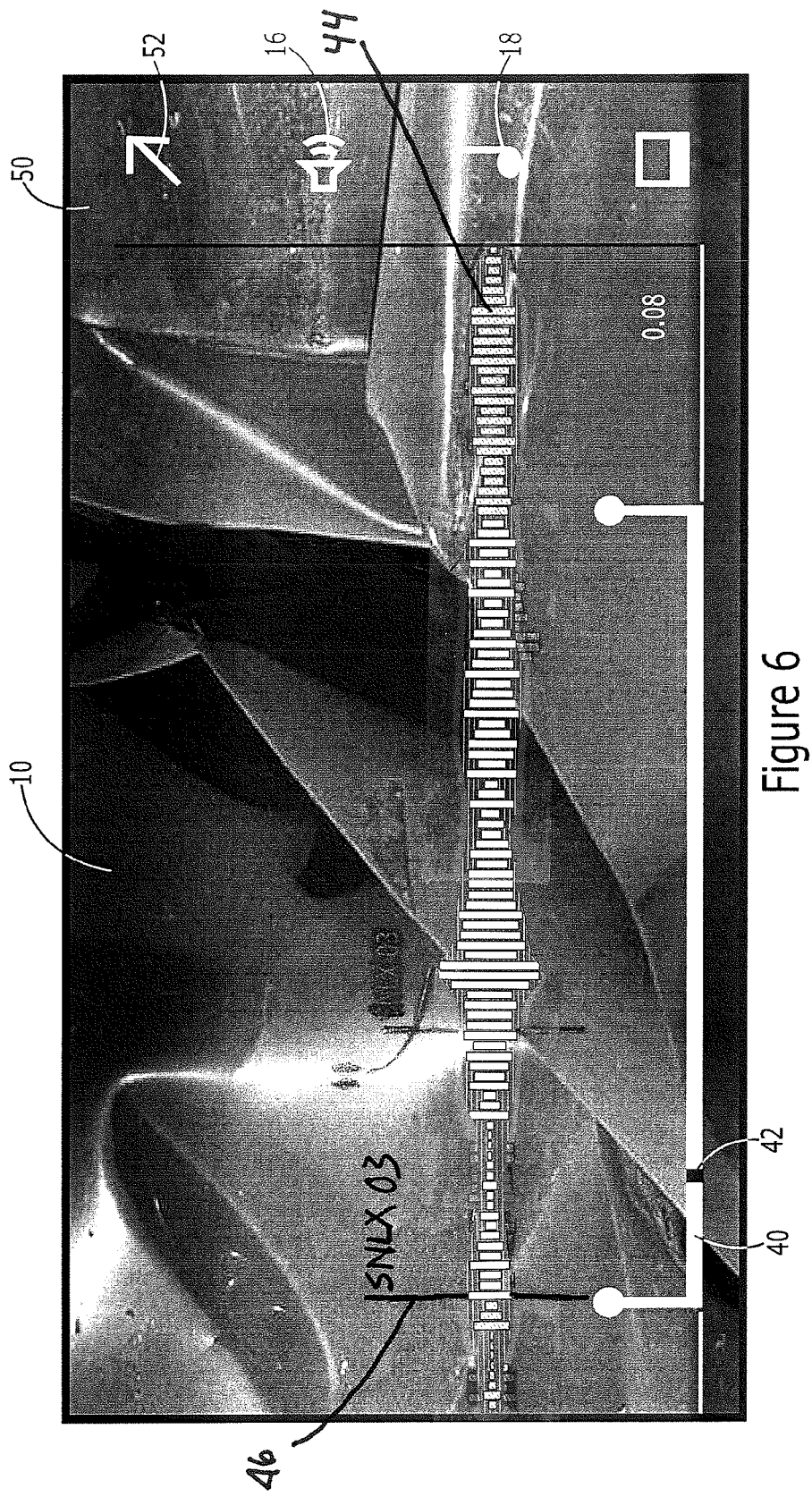
Figure 7:
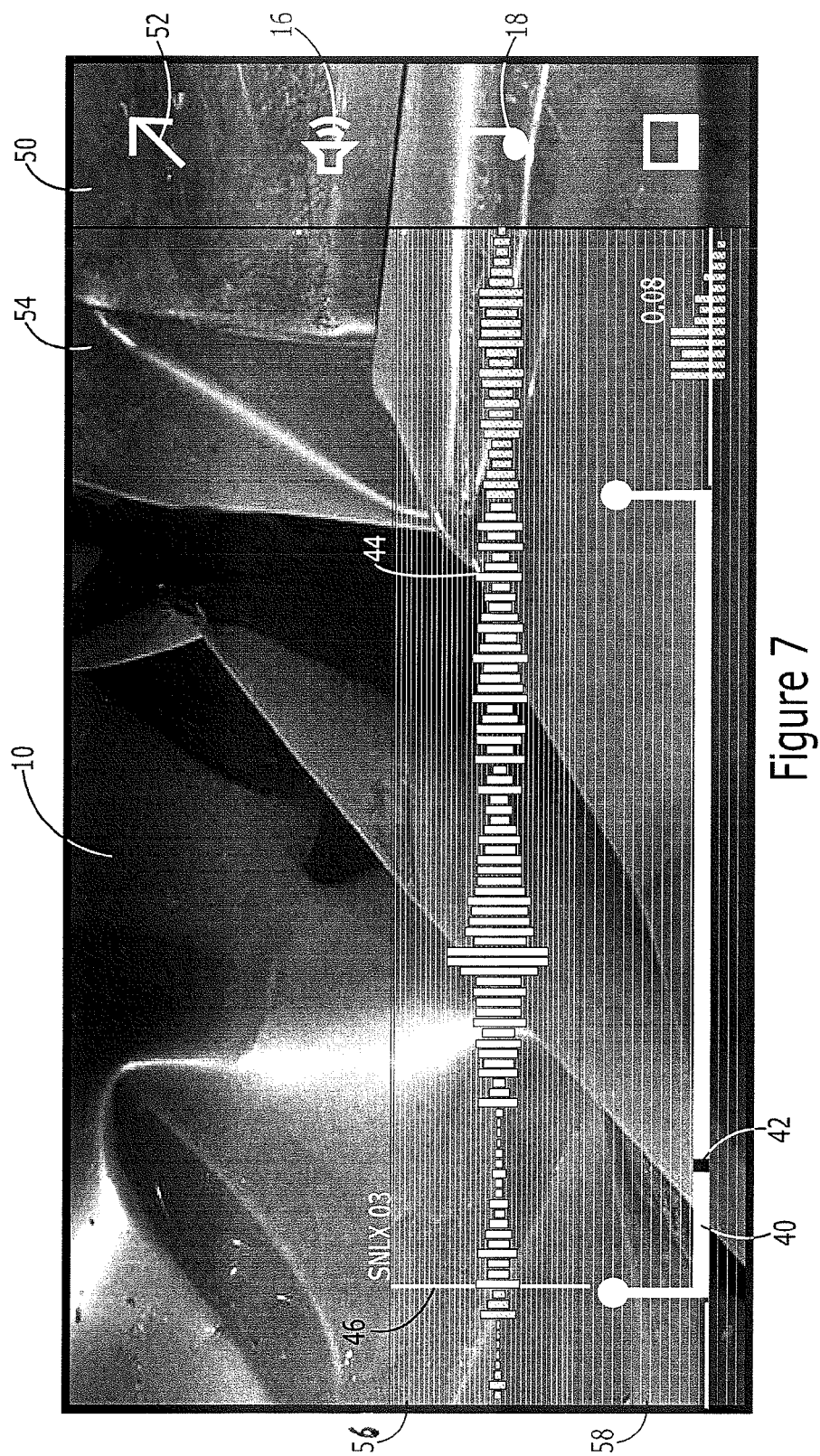

Having thus described example embodiments of the invention in general terms, reference will now be made to the accompanying drawings, which are not necessarily drawn to scale, and wherein:

FIG. 1 depicts a mobile terminal having a user interface configured in accordance with an example embodiment of the present invention in order to facilitate the adjustment of the starting point of an audio soundtrack relative to one or more video clips;

FIG. 2 is a block diagram of an apparatus that may be specifically configured in accordance with an example embodiment of the present invention;

FIG. 3 is a flow chart illustrating operations performed, such as by the apparatus of FIG. 2, in accordance with an example embodiment of the present invention;

FIG. 4 is a visual representation of an audio soundtrack that may be associated with one or more video clips in accordance with an example embodiment of the present invention in which a plurality of markers spaced throughout the audio soundtrack are depicted;

FIG. 5 depicts a mobile terminal having a user interface in which the starting point of the audio soundtrack relative to one or more video clips has been adjusted in response to a drag input in accordance with an example embodiment of the present invention;

FIG. 6 depicts a mobile terminal having a user interface in which the starting point of the audio soundtrack relative to one or more video clips has been adjusted in response to a flick input in accordance with an example embodiment of the present invention; and FIG. 7 depicts a mobile terminal having a user interface that is divided into a plurality of sections in which the user input is differently interpreted in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment in order to facilitate the association of an audio soundtrack with one or more video clips. In particular, the method, apparatus and computer program product of an example embodiment permit the starting point of the audio soundtrack to be defined in relation to the one or more video clips in a manner that is intuitive to the user. However, the resulting combination of the audio soundtrack and the one or more video clips is synchronized based upon a predefined feature of the audio soundtrack, such as a beat of the audio soundtrack, such that the resulting combination provides for an enhanced user experience.

The audio soundtrack may be associated with one or more video clips. For example, the audio soundtrack may be associated with a single video clip for subsequent playback. Alternatively, the audio soundtrack may be associated with a plurality of video clips. In this embodiment, each video clip may be termed a moment and the plurality of moments that are combined may be termed an event reel. Thus, the audio soundtrack may be associated with an event reel in one embodiment. An event reel may consist of any number of moments with each moment either being of the same duration or of a different duration than other moments of the same event reel. In an instance in which the audio soundtrack is associated with an event reel, the audio soundtrack may be associated with a single moment of the event reel or with the entire event reel including each of the constituent moments. For purposes of explanation, but not of limitation, the audio soundtrack will be described to be associated with an event reel comprising a plurality of moments.

With reference to FIG. 1, a user interface 10 configured in accordance with an example embodiment to facilitate the association of an audio soundtrack with one or more video clips is depicted. As shown, a frame of the one or more video clips is displayed upon the user interface concurrent with a visual representation of the audio soundtrack. As described below, a user is permitted to adjust the starting point of the audio soundtrack, such as by providing a drag input or a flick input. In response to the user input, the starting point of the audio soundtrack relative to one or more video clips is adjusted with the starting point defined in a manner so as to coincide with a predefined feature of the audio soundtrack, such as a beat of the audio soundtrack. Thus, the method, apparatus and computer program product of an example embodiment permit users to combine an audio soundtrack and one or more video clips in an intuitive manner with the starting point of the audio soundtrack being defined relative to the one or more video clips based not only upon the user input, but also the predefined feature of the audio soundtrack such as the resulting combination of the audio soundtrack and the one or more video clips provides for an enhanced user experience.

The apparatus 20 of an example embodiment may be embodied by or associated with any of a variety of computing devices that include or are otherwise associated with a user interface that facilitates user interaction with an audio soundtrack relative to one or more video clips. For example, the computing device may be a mobile terminal, such as a personal digital assistant (PDA), mobile telephone, smart phone, companion device, for example, a smart watch, pager, mobile television, gaming device, laptop computer, camera, tablet computer, touch surface, video recorder, audio/video player, radio, electronic book or any combination of the aforementioned, and other types of voice and text communications systems. Alternatively, the computing device may be a fixed computing device, such as a personal computer, a computer workstation, a kiosk or the like. Still further, the apparatus may be embodied by or associated with a plurality of computing devices that are in communication with or otherwise networked with one another such that the various functions performed by the apparatus may be divided between the plurality of computing devices that operate in collaboration with one another. For purposes of illustration, but not of limitation, an apparatus embodied by a mobile terminal 14, such as a smart phone, is depicted and will be described herein. However, the apparatus may be embodied by other types of computing devices as noted above.

Regardless of the type of computing device that embodies or is otherwise associated with the apparatus 20, the apparatus of an example embodiment is depicted in FIG. 2. The apparatus may include, be associated with or otherwise in communication with a processor 22, a memory device 24 and a user interface 26. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 26, e.g., user interface 10 of FIG. 1. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 22 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface that may be any means such as a device or circuitry embodied in either hardware or a combination of hardware and software that is configured to receive and/or transmit data from/to other electronic devices in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

Referring now to FIG. 3, the operations performed, such as by the apparatus 20 of FIG. 2, in accordance with an example embodiment of the present invention are depicted. As shown in block 30, the apparatus may include means, such as the processor 22, the user interface 26 or the like, for causing display of a frame of a video clip. The apparatus, such as the processor, the user interface or the like, may be configured to cause any frame of the one or more video clips to be displayed. For example, the first frame of the one or more video clips may be displayed. Alternatively, a reference frame may be displayed that has been selected, such as by the user or otherwise, to represent the one or more video clips. The one or more video clips may be stored by the memory 24 and caused by the processor 22 to be displayed by the user interface 26. Alternatively, the one or more video clips may be received, such as a communications interface from a server or other network element, and the caused to be displayed.

During or prior to the playback of the one or more video clips, the apparatus 20, such as the user interface 26, may be configured to receive user input to selectively activate various control inputs. For example, the one or more video clips may have an audio recording associated therewith. As such, the user interface may include a control input 16 configured to toggle on or off, e.g., selectively activate, the audio recording that is associated with the one or more video clips. Additionally or alternatively, the user interface may include a control input 18 configured to toggle on or off, e.g., selectively activate, the audio soundtrack that is associated with one or more video clips. In an instance in which the audio soundtrack is toggled off, any audio soundtracks associated with individual moments of an event reel may be output when the corresponding moment is displayed. However, in an instance in which the audio soundtrack is toggled on, the audio soundtrack associated with the event reel is output and any audio soundtracks associated with individual moments of an event reel are disregarded. As described below, the user interface may additionally or alternatively be configured to receive user input that defines the size of the video frame, thereby permitting the video frames of the one or more video clips to be trimmed or otherwise sized as desired.

Concurrent with the display of a frame of the one or more video clips, the apparatus 20, such as the processor 22, the user interface 26 or the like, may be configured to cause the display of a timeline 40 that represents the duration of the one or more video clips with which the audio soundtrack is to be associated. As shown in FIG. 1, for example, a visual indication 42 may be presented upon the timeline that indicates the current playback location of the one or more video clips relative to the entirety of the one or more video clips.

In addition to causing the display of a frame of a video clip, the apparatus 20 includes means, such as the processor 22, the user interface 26 or the like, for causing display of a visual representation 44 of an audio soundtrack. As described below, the audio soundtrack is associated with the one or more video clips. The audio soundtrack may be any of a variety of audio soundtracks. For example, the apparatus, such as the memory 24, may have stored a plurality of predefined audio soundtracks that are selectable by the user for association with one or more video clips. Additionally or alternatively, the user may have previously recorded the audio soundtrack and may have stored the recorded audio soundtrack, such as in the memory.

The visual representation 44 of the audio soundtrack may be displayed concurrent with the display of a frame of the video clip with which the audio soundtrack will be associated. The audio soundtrack may be visually represented in various manners. However, in the illustrated embodiment, a waveform representative of the audio soundtrack is presented with the waveform providing a visual representation of the magnitude of the audio signal at each of a plurality of points in time throughout the duration of the audio soundtrack. Although various types of audio soundtracks may be utilized including stereo soundtracks, mono soundtracks and the like, the audio soundtrack of the illustrated embodiment is representative of a stereo soundtrack in which the audio soundtracks for the left and right channels are combined, such as by being averaged, with the resulting visual representation depicting the magnitude of the average of the combination of the left and right channels of the stereo audio soundtrack throughout its duration. While the visual representation of the audio soundtrack is shown to have a beginning and an end at the left and right sides, respectively, of the user interface 26, the apparatus 20, such as the processor 22, the user interface or the like, may be configured such that the audio soundtrack is repeated in a continuous fashion, such as in a loop, such that the beginning of the audio soundtrack immediately follows the end of the audio soundtrack such that the audio soundtrack may continue without interruption.

Upon displaying the visual representation 44 of the audio soundtrack, a starting point within the audio soundtrack relative to the one or more video clips is identified. The starting point of the audio soundtrack relative to the one or more video clips need not be the beginning of the audio soundtrack, but may be any point within the audio soundtrack. During subsequent playback of the one or more video clips and the associated audio soundtrack, the portion of the audio soundtrack that is output commences at the starting point. By permitting the starting point within the audio soundtrack to be tailored as described below, such as by the user, the portion of the audio soundtrack associated with the one or more video clips may be customized by the user to create an improved user experience, such as by permitting the portion of the audio soundtrack that is to be played back to be selected such that the portion of the audio soundtrack matches the theme or mood of the video clip(s).

Upon the initial display of the visual representation 44 of the audio soundtrack, the apparatus 20, such as the processor 22, the user interface 26 or the like, is configured to randomly select the starting point within the audio soundtrack. In this regard, the starting point may be randomly selected such that each time that the visual representation of the audio soundtrack is displayed to facilitate its association with one or more video clips, a different starting point within the audio soundtrack is identified.

As shown in FIG. 4, the visual representation 44 of the audio soundtrack may be divided into a plurality of segments with each segment visually separated from an adjacent segment by a respective marker 46. As such, the visual representation of the audio soundtrack of an example embodiment includes a plurality of markers spaced there throughout. These markers may be displayed in conjunction with the visual representation of the audio soundtrack or the markers need not be displayed, but may remain associated with the different segments of the audio soundtrack. Additionally, a name or other designation associated with each segment as well as the time associated with the beginning of each segment, relative to the beginning of the audio soundtrack, may be associated with the audio soundtrack and, in some embodiments, displayed concurrent with the visual representation of the audio soundtrack. In the illustrated embodiment, for example, the marker for one segment of the audio soundtrack designated SNLX 03, that is, the marker that is closest to the visual indication 42 of the current playback location within the timeline representative of the one or more video clips, is displayed. In an example embodiment, upon the initial display of the visual representation of the audio soundtrack, the apparatus 20, such as the processor 22, may be configured to randomly select the starting point to be one of the markers that divide the audio soundtrack into segments.

As shown in block 34 of FIG. 3, the apparatus 20 includes means, such as the processor 22, the user interface 26 or the like, for receiving user input with respect to the audio soundtrack while the visual representation 44 of the audio soundtrack is displayed and, in the illustrated embodiment, while a frame of the one or more video clips is concurrently displayed. In response to the user input, the apparatus also includes means, such as the processor or the like, for adjusting the starting point of the audio soundtrack relative to the one or more audio clips. See block 36 of FIG. 3. In this regard, the user input may provide an indication that the starting point of the audio soundtrack relative to the one or more video clips is to be prior to the current starting point or subsequent to the current starting point. Thus, the apparatus, such as the processor, is configured to define the starting point of the audio soundtrack relative to the one or more video clips based upon the user input. The apparatus, such as the processor, of this example embodiment is also configured to define the starting point of the audio soundtrack relative to the one or more video clips not only based on the user input, but also in a manner so as to coincide with a predefined feature of the audio soundtrack.

In this regard, the apparatus 20, such as the processor 22, may be configured to adjust the starting point of the audio soundtrack relative to the one or more video clips based on the user input and may thereafter refine the definition of the starting point of the audio soundtrack relative to the one or more video clips so as to coincide with a predefined feature of the audio soundtrack. By way of example, the audio soundtrack may have a tempo as defined by a plurality of beats and, more particularly, by a predefined number of beats per minute, e.g., 120 beats per minute (bpm). Thus, after having adjusted the starting point of the audio soundtrack relative to the one or more video clips based on the user input, the apparatus, such as the processor, may be configured to further adjust the starting point of the audio soundtrack so as to coincide with a beat of the audio soundtrack, such as to coincide with the nearest beat of the audio soundtrack to the starting point defined based upon the user input, to the next successive beat of the audio soundtrack relative to the starting point defined based upon the user input, or to the immediately preceding beat of the audio soundtrack relative to the starting point defined based upon user input. By further defining the starting point of the audio soundtrack relative to the one or more video clips so as to coincide with a predefined feature, such as a beat, of the audio soundtrack, the resulting combination of the one or more video clips and the audio soundtrack may be better synchronized so as to enhance the user experience upon playback.

As noted above, the audio soundtrack of an example embodiment includes a predefined number of beats per minute. In an embodiment in which the video clips are recorded or cut to have a duration equal to a multiple of a whole second, the audio soundtracks that are associated with the video clips may be similarly selected to have a tempo with a predefined number of beats per minute that is a multiple of 60, thereby having an even multiple of beats per second, such as one beat per second, two beats per second, or the like. In this example embodiment, the apparatus 20, such as the processor 22, may be configured to adjust the starting point of the audio soundtrack relative to the one or more video clips such that the starting point of the audio soundtrack coincides with a second or a predefined fraction of a second, such as a half second, relative to the beginning of the audio soundtrack. As such, the apparatus of this example embodiment ensures that the one or more video clips and the selected portion of the audio soundtrack are synchronized.

Various types of user input may be provided in order to adjust the starting point of the audio soundtrack. In an example embodiment, the user input may be a drag input and/or a flick input. As such, the apparatus 20, such as the processor 22, the user interface 26 or the like, may be configured to receive a drag input in which the user places their finger, stylus or the like (hereinafter generically referenced as an "input element") upon the user interface, such as a touchscreen display, and moves their input element in a direction, such as toward the beginning of the visual representation 44 of the audio soundtrack or the end of the visual representation of the audio soundtrack, that includes a component that extends in parallel to the axis representative of time in the visual representation of the audio soundtrack. For example, the drag input may extend in a direction that is parallel or substantially parallel to the axis representative of time in the visual representation of the audio soundtrack, such as in a horizontal direction to the right or the left in the illustrated embodiment of FIG. 1. In order to distinguish a drag input from a flick input, the speed at which the user moves their input element with respect to the user interface may also be required to be less than a predefined maximum velocity in order to be recognized as a drag input.

Additionally or alternatively, the apparatus 20, such as the processor 22, the user interface 26 or the like, may be configured to receive a flick input in which the user touches the user interface, such as a touchscreen display, with an input element and then flicks the input element in a direction, such as toward the beginning of the visual representation 44 of the audio soundtrack or toward the end of the visual representation of the audio soundtrack, that includes a component that extends in parallel to the axis representative of time in the visual representation of the audio soundtrack. For example, like the drag input, the flick input may extend in a direction that is parallel or substantially parallel to the axis representative of time in the visual representation of the audio soundtrack, such as in a horizontal direction to the right or the left in the illustrated embodiment of FIG. 1. In order to distinguish a flick input from a drag input, the speed at which the user moves their input element with respect to the user interface may also be required to be greater than a predefined minimum velocity in order to be recognized as a flick input. Moreover, the user may be required to lift the input element from the user interface at the conclusion of the flick gesture.

While described above in conjunction with a drag input and a flick input provided via a user interface 26 that includes a touchscreen display, other types of user input and, in particular, other manners of providing a drag input or a flick input may be encompassed by other embodiments of the present invention. For example, the drag input and the flick input may be provided by movement of a cursor in a direction across the screen with the movement of the cursor at a speed less than a predefined maximum velocity being considered a drag input and the movement of the cursor at a speed greater than the predefined minimum velocity being considered a flick input.

The apparatus 20, such as the processor 22, the user interface 26 or the like, may be configured to adjust the starting point of the audio soundtrack relative to the one or more video clips in a different manner depending upon the type of user input. With respect to a drag input, for example, the apparatus, such as the processor, the user interface or the like, may be configured to adjust the starting point in the direction indicated by the drag input and to define the starting point to be a predefined time increment of the audio soundtrack that is offset from the prior starting point of the audio soundtrack, such as the initially defined starting point of the audio soundtrack, with respect to the visual representation 44 of the audio soundtrack by a distance equal to the distance traversed by the drag input. Thus, in an instance in which the drag input extends across the display two centimeters to the left, the starting point of the audio soundtrack is adjusted so as to be at that point within the audio soundtrack that is two centimeters to the left along the visual representation of the audio soundtrack relative to the prior starting point.

As described above, a visual indication 42 may be presented along the timeline 40 representative of the duration of the one or more video clips in order to indicate the current playback location of the one or more video clips, that is, to indicate the point within the one or video clips at which playback would begin. In this embodiment, the apparatus 20, such as the processor 22, is configured to adjust the starting point of the audio soundtrack in a direction indicated by the drag input, that is, toward the beginning of the audio soundtrack or toward the end of the audio soundtrack. In addition, the apparatus of this example embodiment, such as the processor, is configured to define the starting point of the audio soundtrack to be a predefined time increment, e.g., a beat, of the audio soundtrack that is nearest to the portion of the visual representation 44 of the audio soundtrack that is aligned with the visual indication of the current playback location of the one or more video clips upon termination of the drag input. In the illustrated embodiment of FIG. 5, for example, the portion of the visual representation of the audio soundtrack that is aligned with the visual indication of the current playback location is that portion of the visual representation of the audio soundtrack that is aligned vertically with the visual indication of the current playback location of the one or more video clips. However, the timeline and the visual representation of the audio soundtrack may be presented in other orientations and, as such, alignment may be defined in other manners in other embodiments.

In an example embodiment, audio feedback may also be provided to the user during receipt of a drag input. In this regard, the apparatus 20, such as the processor 22, the user interface 26 or the like, may be configured to cause a predetermined audio output to be provided while receiving the user input, e.g., the drag input, with respect to the audio soundtrack. While various forms of predetermined audio output may be provided, audio output that mimics the record scratching sound created by dragging a needle of a record player across a vinyl record may be output.

With respect to a flick input, the apparatus 20, such as the processor 22, the user interface 26 or the like, is configured to adjust the starting point to be coincident with the marker 46 within the audio soundtrack that is next in the direction indicated by the flick input. See FIG. 6. Thus, in an instance in which the flick input is to the left relative to the visual representation 44 of an audio soundtrack that extends from the left to the right across the user interface, the starting point of the audio soundtrack is adjusted to coincide with the next successive marker along the audio soundtrack relative to the prior starting point. Indeed, in an instance in which the prior starting point coincides with the marker for the second segment of the audio soundtrack designated SNLX 02 (or to a location within the second segment of the audio soundtrack), a flick input to the left may cause the starting point to be adjusted to coincide with the marker associated with the third segment of the audio soundtrack designated SNLX 03. By way of further example, in an instance in which the flick input is to the right relative to the visual representation of an audio soundtrack, the starting point of the audio soundtrack is adjusted to coincide with the prior preceding marker along the audio soundtrack relative to the prior starting point. Indeed, in an instance in which the prior starting point coincides with the marker for the third segment of the audio soundtrack designated SNLX 03, a flick input to the right may cause the starting point to be adjusted to coincide with the marker associated with the second segment of the audio soundtrack designated SNLX 02. Although the starting point of the audio soundtrack that is to be played in conjunction with the initial frames of the video clip may be adjusted to coincide with the marker associated with the next segment of the audio soundtrack as depicted in FIG. 6, e.g., the marker associated with the next segment of the audio soundtrack is aligned with the beginning of the video clip as represented by the timeline 40, the flick input of an alternative embodiment may cause the marker associated with the next segment of the audio soundtrack (in the direction of the flick input) to be aligned with the current playback location as represented by the visual indication 42 may be presented upon the timeline.

In order to provide further control over the manner in which the starting point of the audio soundtrack is adjusted relative to the current playback location of one or more video clips, the user may provide an ordered sequence of user inputs including one or more drag inputs and one or more flick inputs. In this regard, each user input may cause the starting point of the audio soundtrack to be adjusted in the manner described above with the entire sequence of user inputs collectively having a cumulative impact upon the starting point of the audio soundtrack. In order to provide feedback of the portion of the audio soundtrack that will be associated with the one or more video clips, the portion of the visual representation 44 of the audio soundtrack will be output with the one or more video clips may be differently shaded than the remainder of the visual representation of the audio soundtrack and, as shown in FIG. 1, may be aligned with the timeline 40 representative of the one or more video clips.

Once the user has defined the starting point of the audio soundtrack relative to the one or more video clips in a desired manner, the association of the audio soundtrack including the defined starting point with respect to the one or more video clips and, more particularly, with respect to the current playback location of the one or more video clips may be saved, such as in response to the provision of a predefined user input. Thereafter, in an instance in which the one or more video clips are selected for playback and in which the audio soundtrack mode is enabled, e.g., is toggled on, a portion of the audio soundtrack will play concurrent with the display of the one or more video clips with the starting point of the audio soundtrack coinciding with the current playback location of the one or more video clips. As such, the portion of the audio soundtrack that is output is synchronized with respect to the one or more video clips in order to provide an enhanced user experience.

The user inputs may be provided in various manners. In an example embodiment in which the user interface 26 is a touchscreen display, the touchscreen display may be divided into regions configured to receive different types of user input. For example, the user interface may be divided into four regions. As shown in FIG. 7, in a first region 50, one or more of a control input 16 configured to toggle on and off the audio recording associated with the video clips, a control input 18 to toggle on and off the soundtrack mode, and a control input 52 to save the starting point of the audio soundtrack defined by the user may be provided. In a second region 54 of the user interface, user input to cause the video clip(s) to play or to pause may be provided. In a third region 56 of the user interface, such as that portion that overlies the visual representation 44 of the audio soundtrack, user input configured to adjust the starting point of the audio soundtrack, such as a drag input or a flick input, may be provided. Further, a fourth region 58 of the user interface may be configured to receive user input to size or resize, such as by trimming, the video clips. Although the user interface of this example embodiment may be divided into the plurality of portions in different manners, the first portion of the user interface may be defined along one of the sides of the user interface, such as the right side of the user interface, while the second, third and fourth sections of the user interface may be defined as horizontally extending regions, such as with the second region proximate the upper edge of the user interface, the third region extending across the medial portion of the user interface, such as to overlie the visual representation of the audio soundtrack, and the fourth portion extending across the user interface proximate a lower edge of the user interface. However, the relative orientation of these different portions of the user interface and, indeed, the configuration of the user interface in this manner is merely provided by way of an example, but not of limitation.

The method, apparatus 20 and computer program product of example embodiments provide numerous technical advantages including the conservation of processing resources and the associated power consumption otherwise expended in an effort to associate an audio soundtrack with one or more video clips utilizing tools that are more complex and less user friendly and that may result in the increased user interaction in an effort to provide for the desired synchronization therebetween.

In addition to supporting user synchronization of an audio soundtrack with one or more video clips, the computing device may be configured to support one or more other functions. For example, the computing device of an example embodiment may also support a mapping application so as to present maps or otherwise provide mapping information. In order to support a mapping application, the computing device may include or otherwise be in communication with a geographic database, such as may be stored in memory 24. For example, the geographic database includes node data records, road segment or link data records, point of interest (POI) data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or global positioning system (GPS) data associations (such as using known or future map matching or geo-coding techniques), for example.

In example embodiments, the road segment data records are links or segments representing roads, streets, or paths, as can be used in the calculated route or recorded route information for determination of one or more personalized routes, according to example embodiments. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the computing device, for example. The navigation-related functions can correspond to vehicle navigation, pedestrian navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database can be a master geographic database, but in alternate embodiments, the client side geographic database can represent a compiled navigation database that can be used in or with the computing device to provide navigation and/or map-related functions. For example, the geographic database can be used with the end user device to provide an end user with navigation features. In such a case, the geographic database can be downloaded or stored on the computing device, such as in applications, or the computing device can access the geographic database through a wireless or wired connection (such as via a server and/or a communication network), for example.

In one embodiment, the computing device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. Thus, in addition to accessing various media files as described above, the user can use the computing device of an example embodiment for navigation and map functions such as guidance and map display, for example, and for determination of one or more personalized routes or route segments based on one or more calculated and recorded routes, according to example embodiments.

As described above, FIG. 3 illustrates a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   causing display of a visual representation of an audio soundtrack, wherein the audio soundtrack is prestored and is to be associated with one or more video clips to facilitate concurrent playback of at least a portion of the audio soundtrack and the one or more video clips;
   receiving user input with respect to the audio soundtrack; and
   in response to the user input, adjusting a starting point of the audio soundtrack relative to the one or more video clips, wherein adjusting the starting point comprises adjusting the starting point of the audio soundtrack based on the user input and, after having adjusted the starting point of the audio soundtrack based on the user input, further adjusting the starting point of the audio soundtrack so as to coincide with a predefined feature of the audio soundtrack, thereby refining the starting point of the audio soundtrack relative to that indicated by the user input.

2. A method according to claim 1 wherein receiving user input comprises receiving a drag input, and wherein adjusting the starting point comprises adjusting the starting point in a direction indicated by the drag input and defining the starting point to be a predefined time increment of the audio soundtrack that is nearest to a portion of the visual representation of the audio soundtrack that is aligned with a visual indication of a current playback location of the one or more video clips upon termination of the drag input.

3. A method according to claim 2 wherein the predefined time increment corresponds with a beat of the audio soundtrack.

4. A method according to claim 2 wherein the predefined time increment comprises a second or a predefined fraction of a second.

5. A method according to claim 2 further comprising causing a predetermined audio output to be provided while receiving the user input with respect to the audio soundtrack.

6. A method according to claim 1 wherein the visual representation of the audio soundtrack includes a plurality of markers spaced therethroughout, wherein receiving user input comprises receiving a flick input, and wherein adjusting the starting point comprises adjusting the starting point to be coincident to the marker that is next in a direction indicted by the flick input.

7. A method according to claim 1 further comprising causing display of a frame of a video clip concurrent with the visual representation of the audio soundtrack and during receipt of the user input with respect to the audio soundtrack.

8. An apparatus comprising at least one processor and at least one memory including computer program code, the at least one memory and computer program code configured to, with the processor, cause the apparatus to at least:
   cause display of a visual representation of an audio soundtrack, wherein the audio soundtrack is prestored and is to be associated with one or more video clips to facilitate concurrent playback of at least a portion of the audio soundtrack and the one or more video clips;
   receive user input with respect to the audio soundtrack; and
   in response to the user input, adjust a starting point of the audio soundtrack relative to the one or more video clips, wherein the starting point is adjusted by adjusting the starting point of the audio soundtrack based on the user input and, after having adjusted the starting point of the audio soundtrack based on the user input, further adjusting the starting point of the audio soundtrack so as to coincide with a predefined feature of the audio soundtrack thereby refining the starting point of the audio soundtrack relative to that indicated by the user input.

9. An apparatus according to claim 8 wherein the at least one memory and the computer program code are configured to, with the processor, cause the apparatus to receive user input by receiving a drag input, and wherein the at least one memory and the computer program code are configured to, with the processor, cause the apparatus to adjust the starting point by adjusting the starting point in a direction indicated by the drag input and defining the starting point to be a predefined time increment of the audio soundtrack that is nearest to a portion of the visual representation of the audio soundtrack that is aligned with a visual indication of a current playback location of the one or more video clips upon termination of the drag input.

10. An apparatus according to claim 9 wherein the predefined time increment corresponds with a beat of the audio soundtrack.

11. An apparatus according to claim 9 wherein the predefined time increment comprises a second or a predefined fraction of a second.

12. An apparatus according to claim 9 wherein the at least one memory and the computer program code are further configured to, with the processor, cause the apparatus to cause a predetermined audio output to be provided while receiving the user input with respect to the audio soundtrack.

13. An apparatus according to claim 8 wherein the visual representation of the audio soundtrack includes a plurality of markers spaced therethroughout, wherein the at least one memory and the computer program code are configured to, with the processor, cause the apparatus to receive user input by receiving a flick input, and wherein the at least one memory and the computer program code are configured to, with the processor, cause the apparatus to adjust the starting point by adjusting the starting point to be coincident to the marker that is next in a direction indicted by the flick input.

14. An apparatus according to claim 8 wherein the at least one memory and the computer program code are further configured to, with the processor, cause the apparatus to cause display of a frame of a video clip concurrent with the visual representation of the audio soundtrack and during receipt of the user input with respect to the audio soundtrack.

15. A computer program product comprising at least one non-transitory computer-readable storage medium having computer-executable program code portions stored therein, the computer-executable program code portions comprising program code instructions configured to:

cause display of a visual representation of an audio soundtrack, wherein the audio soundtrack is prestored and is to be associated with one or more video clips to facilitate concurrent playback of at least a portion of the audio soundtrack and the one or more video clips;

receive user input with respect to the audio soundtrack; and in response to the user input, adjust a starting point of the audio soundtrack relative to the one or more video clips, wherein the program code instructions configured to adjust the starting point comprise program code instructions configured to adjust the starting point of the audio soundtrack based on the user input and, after having adjusted the starting point of the audio soundtrack based on the user input, to further adjust the starting point of the audio soundtrack so as to coincide with a predefined feature of the audio soundtrack, thereby refining the starting point of the audio soundtrack relative to that indicated by the user input.

16. A computer program product according to claim 15 wherein the program code instructions configured to receive user input comprise program code instructions configured to receive a drag input, and wherein the program code instructions configured to adjust the starting point comprise program code instructions configured to adjust the starting point in a direction indicated by the drag input and define the starting point to be a predefined time increment of the audio soundtrack that is nearest to a portion of the visual representation of the audio soundtrack that is aligned with a visual indication of a current playback location of the one or more video clips upon termination of the drag input.

17. A computer program product according to claim 16 wherein the predefined time increment corresponds with a beat of the audio soundtrack.

18. A computer program product according to claim 16 wherein the predefined time increment comprises a second or a predefined fraction of a second.

19. A computer program product according to claim 16 wherein the computer-executable program code portions further comprise program code instructions configured to cause a predetermined audio output to be provided while receiving the user input with respect to the audio soundtrack.

20. A computer program product according to claim 15 wherein the visual representation of the audio soundtrack includes a plurality of markers spaced therethroughout, wherein the program code instructions configured to receive user input comprise program code instructions configured to receive a flick input, and wherein the program code instructions configured to adjust the starting point comprise program code instructions configured to adjust the starting point to be coincident to the marker that is next in a direction indicted by the flick input.

* * * * *